US007224868B2

(12) United States Patent
Watts et al.

(10) Patent No.: US 7,224,868 B2
(45) Date of Patent: May 29, 2007

(54) RADIATION-FREE OPTICAL CAVITY

(75) Inventors: Michael R. Watts, Hingham, MA (US);
Steven G. Johnson, St. Charles, IL (US); Hermann A. Haus, Lexington, MA (US); John D. Joannopoulos, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/279,777

(22) Filed: Oct. 24, 2002

(65) Prior Publication Data
US 2003/0118289 A1    Jun. 26, 2003

Related U.S. Application Data

(60) Provisional application No. 60/332,619, filed on Nov. 14, 2001, provisional application No. 60/335,036, filed on Oct. 24, 2001.

(51) Int. Cl.
*G02B 6/26* (2006.01)
(52) U.S. Cl. .......................... 385/39; 385/50; 385/15; 385/37; 372/90
(58) Field of Classification Search ................... 385/39
See application file for complete search history.

(56) References Cited
U.S. PATENT DOCUMENTS

| 4,743,083 | A | * | 5/1988 | Schimpe ..................... 385/37 |
| 4,961,618 | A | * | 10/1990 | Jordan et al. ............... 385/130 |
| 5,357,591 | A | * | 10/1994 | Jiang et al. .................. 385/37 |
| 5,784,400 | A |   | 7/1998 | Joannopoulos et al. |
| 5,907,427 | A |   | 5/1999 | Scalora et al. |
| 6,002,522 | A |   | 12/1999 | Todori et al. |
| 6,198,860 | B1 |  | 3/2001 | Johnson et al. |
| 6,396,617 | B1 | * | 5/2002 | Scalora ...................... 359/248 |
| 6,660,192 | B1 | * | 12/2003 | Kim et al. .................. 264/1.27 |
| 2002/0106160 | A1 | * | 8/2002 | Cox et al. ..................... 385/49 |
| 2003/0133641 | A1 | * | 7/2003 | Yoo ............................ 385/14 |

FOREIGN PATENT DOCUMENTS

WO      WO 96/11516       4/1996

OTHER PUBLICATIONS

[on-line] http://en.wikipidea.org/wiki/Refractive_index.*
Jiri Ctyroky, Photonic Bandgap Structures in Planar Waveguides, Optical Society of America, Aug. 2001, pp. 435-441.
International Search Report for PCT/US02/34028.

* cited by examiner

*Primary Examiner*—Nikita Wells
*Assistant Examiner*—Phillip A. Johnston
(74) *Attorney, Agent, or Firm*—Daly, Crowley, Mofford & Dukee, LLP

(57) ABSTRACT

The present invention provides a micro-resonator including a plurality of waveguides forming optic junctions therebetween, with adjacent waveguides having different core permittivities and different cladding permittivities. Adjacent waveguides are mode-matched through adjustments of the core permittivities and the cladding permittivities of the waveguides to reduce or eliminate junction radiation, thereby providing high performance.

34 Claims, 7 Drawing Sheets

RADIATION-FREE OPTICAL CAVITY

CROSS REFERENCE TO RELATED APPLICATIONS

This application claims priority under 35 U.S.C. § 119(e) to provisional patent application Ser. No. 60/335,036 filed Oct. 24, 2001; the disclosure of which is incorporated by reference herein and to provisional patent application Ser. No. 60/332,619 filed Nov. 14, 2001; the disclosure of which is incorporated by reference herein.

STATEMENT REGARDING FEDERALLY SPONSORED RESEARCH

This invention was made with government support under Grant Number DMR-9808941 awarded by NSF. The Government has certain rights in the invention.

BACKGROUND OF THE INVENTION

As is known in the art, high data rate optical fiber communication is achieved by subdividing the transmission spectrum of the fiber into many separate channels and then transmitting data rates compatible with electronic devices on each channel. This process is known as wavelength division multiplexing (WDM) and requires the use of optical filters, known as wavelength division multiplexers, in order to combine the lower data rate signals at the fiber input and to separate the data signals at the output. The current state of the art in WDM technology is what is commonly referred to as an arrayed waveguide grating (AWG). AWGs exhibit a competitive advantage over traditional thin film filters and bulk gratings since the AWGs are integrated on a chip, and are thus considerably smaller, more stable, and provide a greater degree of functionality.

In spite of the advantages listed above, AWGs have some limitations. Primarily, AWGs occupy large chip areas (>>10 $cm^2$) and provide only moderate spectral efficiency. Integrated resonant devices such as ring resonators and photonic bandgap (PBG) or standing wave resonators occupy much smaller areas (<<$10^{-3}$ $cm^2$) and hold potential for greatly increased spectral efficiency. Resonators are essential optical devices for many other important optical components including lasers and nonlinear switches. A resonant cavity is characterized by its modal volume V and its quality factor Q where Q is a dimensionless lifetime, the time for the mode energy to decay by $e^{-2\pi}$. Many useful devices require cavities that exhibit a very large Q and small volume V.

Three dimensional photonic bandgap (PBG) structures with singular defect sites have been shown to exhibit infinite quality factors while occupying small modal volumes. Similarly, the theoretical Qs of ring resonators can be very high. However, on account of the difficulty in fabricating the complicated geometries associated with three-dimensional PBG structures and ring resonators, considerable interest has been directed toward the simple one-dimensional case. Yet, upon reducing the dimensionality, PBG structures have been shown to radiate, which results in vastly diminished Qs, thereby limiting the devices' utility and effectiveness.

In view of the foregoing it would be desirable to provide integrated optic resonators that either minimize or totally eliminate radiation in one-dimensional PBG structures. It would be further desirable that the integrated optic resonators are manufacturable by planar fabrication techniques.

SUMMARY OF THE INVENTION

With the foregoing background in mind, it is an object of the present invention to provide a device including a plurality of waveguides wherein adjacent waveguides are mode-matched to each other through adjustments of the waveguides' core permittivities and the waveguides' cladding permittivities in order to minimize junction radiation and provide an optical cavity having a large quality factor Q and small modal volume V.

BRIEF DESCRIPTION OF THE DRAWINGS

The invention will be better understood by reference to the following more detailed description and accompanying drawings in which.

DETAILED DESCRIPTION

One-dimensional integrated PBG structures are typically formed by imposing reflecting boundaries at λ/4 separations or multiples of λ/2 thereof. In the center of the device, a defect or shift in the structure is introduced of length λ/4 or multiples of λ/2 thereof. Such structures are not limited to quarter-wave layers with half-wave defects but may be formed in a multitude of geometries. Initially, such structures were formed from gratings etched into the waveguides. More recently, such structures have been formed by etching holes into the waveguide cores. In either case, the disruption of the guide results in substantial radiation.

Figure 1:
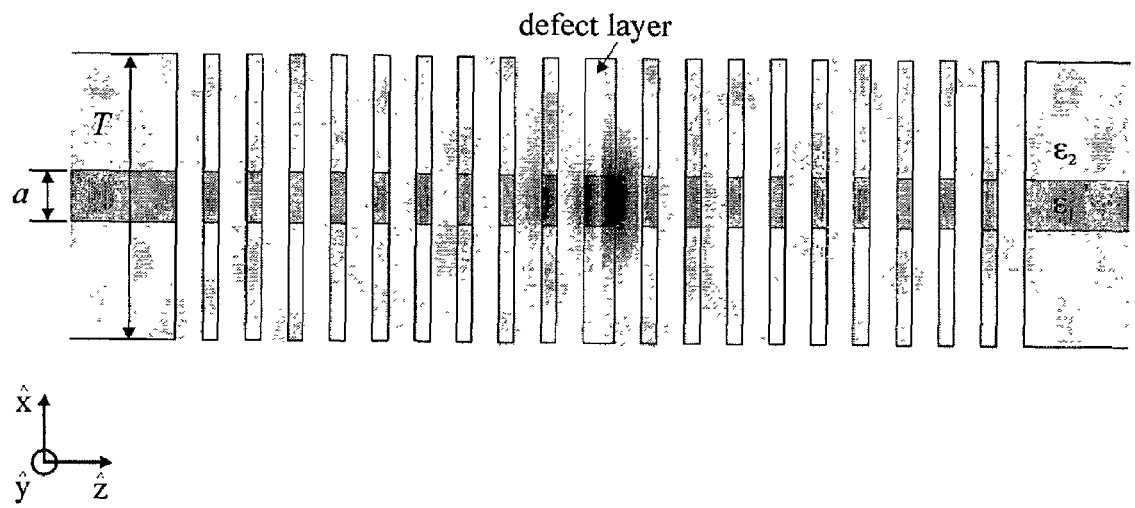
FIG. 1 comprises a finite difference time domain (FDTD) simulation of a two-dimensional optical cavity formed from a singular defect layer without regard for mode-matching of the layers.

Referring now to FIG. 1, a finite difference time domain simulation (FDTD) of such a cavity is presented. Three refractive indices are used with large index contrast both within the waveguide and across the cavity layers so as to ensure a small modal volume. The field magnitude is superimposed on the structure with a nonlinear color scale to highlight the radiation in the structure indicated by the presence of wave-fronts that are not parallel to the section interfaces. The cavity Q is severely limited by the radiation occurring at these interfaces.

Maintaining a small device size while ensuring a substantially large Q is achieved by the present invention by eliminating radiation at the junction interfaces while still maintaining substantial reflection. When a waveguide mode encounters an interface, there are normally radiation losses. However, if the guided mode in one section can be expressed purely as a linear combination of the forward and backward guided modes of the other section, there will be reflections without scattering or radiation.

Figure 2:
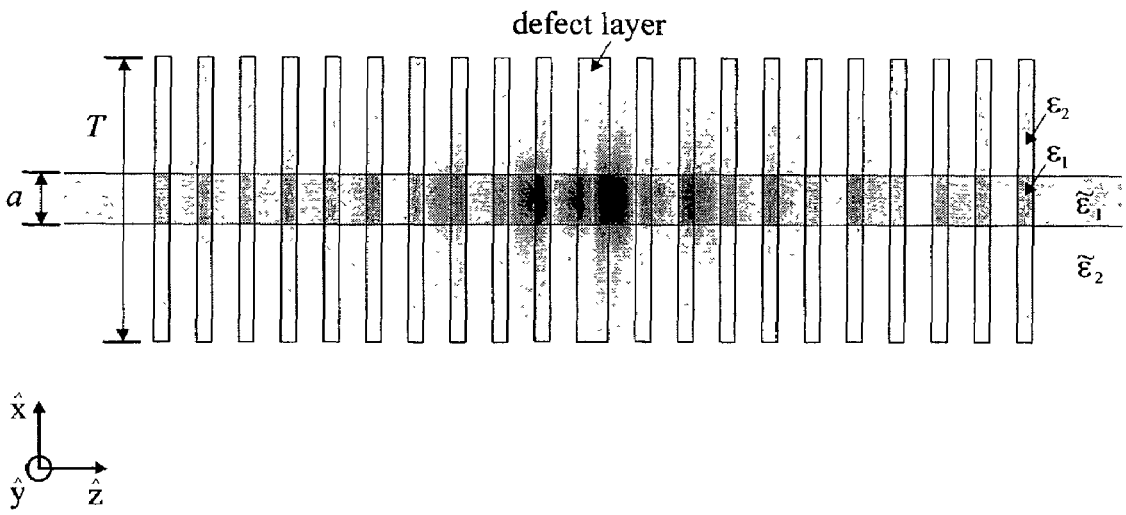
FIG. 2 comprises a finite difference time domain (FDTD) simulation of a two-dimensional optical cavity formed from a singular defect layer with regard for mode-matching of the layers.
Figure 3:
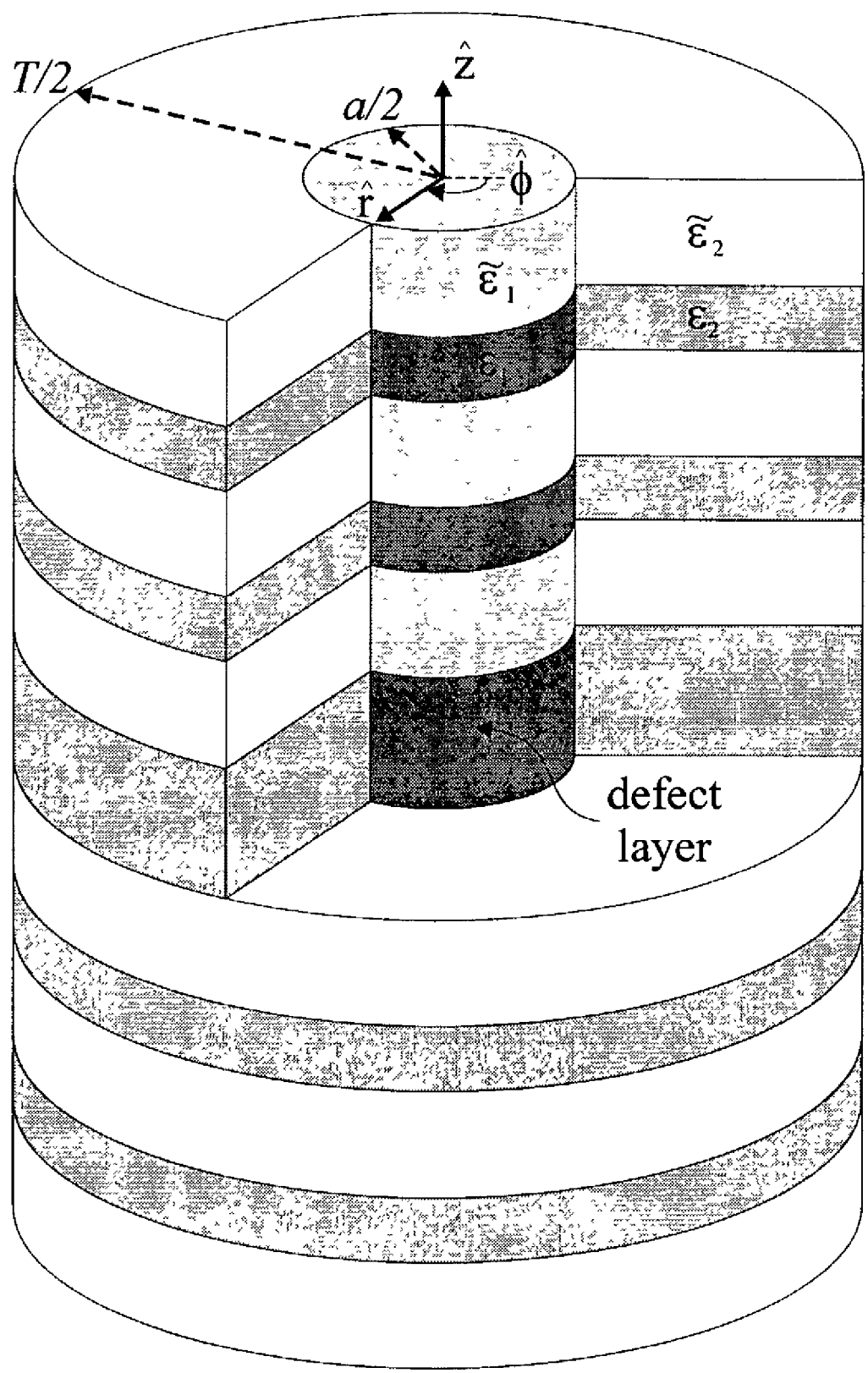
FIG. 3 is a diagram of a cylindrical perfectly mode-matched and radiation-free resonator.

A simple mode-matching proof between a pair of waveguide sections such as any two sections in FIG. 2 or 3 for example is presented. The wave equation for guided modes propagating along $\hat{z}$ with z dependence $e^{-j\beta z}$ is $$(\nabla_t^2 + \mu_0 \epsilon_i \omega^2 - \beta^2) E = 0 \quad (1)$$

where $\nabla_t^2 = \nabla^2 - \partial^2/\partial z^2$ denotes the transverse Laplacian. Similarly, for $\tilde{E}, \tilde{\beta}, \tilde{\epsilon}_i$ in the second waveguide. Since the magnetic and transverse electric fields must be continuous across the junction, the transverse mode profiles $E_T$ and $\tilde{E}_T$ must be at least component-wise proportional if the field solutions are to be composed solely of guided modes. The wave equation for each subsection must be the same, and thus $\epsilon_i \omega^2 - \beta^2/\mu_0 = \tilde{\epsilon}_i \omega^2 - \tilde{\beta}^2/\mu_0$. This implies:

$$\epsilon_1 - \epsilon_2 = \tilde{\epsilon}_1 - \tilde{\epsilon}_2 \quad (2)$$

This condition is not compatible with the condition of continuity on $\hat{n} \cdot (\epsilon_i E_i)$ where $\hat{n}$ is the normal to the waveguide wall, except in the case of $\epsilon_i = \tilde{\epsilon}_i$ or when the normal component of the $E_i$ is zero. Only TE (transverse electric, i.e. an electric field purely parallel to the waveguide walls) modes may satisfy both of these conditions simultaneously. It remains to be shown that a superposition of these guided modes satisfies the boundary conditions entirely. For this, we must include the magnetic field, whose transverse components are given by Faraday's Law in the TE case:

$$\hat{z} \frac{\partial}{\partial z} \times E_T = -j\omega\mu_0 H_T = -j\beta \hat{z} \times E_T \quad (3)$$

As a trial solution we consider a superposition of a forward and a backward propagating mode in the left-hand waveguide and a single forward propagating mode in the right-hand waveguide. At the boundary, it is necessary and sufficient that the transverse field profiles be continuous, and thus $$E_T(1+r) = t \cdot \tilde{E}_T \quad (4)$$

$$H_T(1-r) = t \cdot \tilde{H}_T \quad (5)$$

where $|r|^2$ and $|t|^2$ are the reflection and transmission coefficients. By applying Eq. (3) to Eq. (5) and solving for r, given from above that the transverse electric-field profiles are proportional, we find that all the boundary conditions are satisfied with the usual reflection coefficient:

$$r = \frac{n_{eff} - \tilde{n}_{eff}}{n_{eff} + \tilde{n}_{eff}} \quad (6)$$

with the effective indices $$n_{eff} \equiv \frac{\beta c}{\omega}.$$

That is, the unique solution of Maxwell's equations consists of forward and backward-propagating modes of the normalized amplitudes 1 and r, respectively in the left-hand guide; and a single forward propagating mode in the right-hand guide of normalized amplitude t=1+r. Therefore when (2) is obeyed, and the excited mode is purely TE, all boundary conditions at the junction are necessarily satisfied by guided-mode solutions and the junction is radiation-free. In two dimensions one can always choose the electric field to be TE polarized. In three dimensions, for cylindrical waveguides, the "azimuthually polarized" $TE_{0m}$ are purely TE: their polarization is everywhere directed along $\hat{\phi}$ (parallel to the walls). Because there are only reflections, the system is effectively one-dimensional and so a quarter-wave stack (thicknesses $\pi/2\beta$ and $\pi/2\tilde{\beta}$) with a quarter-wave defect can be used to optimally confine light in the axial direction without sacrificing lateral confinement or Q. In fact, the only limitations on the cavity Q will result from the limited number of Bragg layers and the finite extent of the cladding, as well as fabrication imperfections.

A cylindrical cavity with a field propagating in the axial direction is not the only cylindrical geometry that allows for a radiation-free resonator. Alternatively, the Bragg layers may be used to confine a TE mode in the radial direction while total internal reflection is used to confine the mode in the axial direction (e.g. FIG. 5). The proof is quite similar to the one given above and so we will not repeat the derivation, but rather give the following explanation. A $\hat{\phi}$-polarized $\hat{r}$-directed field may be constructed with an infinite sum of slab modes each separated in angle by the infinitesimal angle $\delta\phi$. The axial field profile must then be the same as the slab mode profile. So long as condition (2) is met with the adjacent radial waveguide layer, an equivalent $\hat{\phi}$-polarized $\hat{r}$-directed field profile can be constructed out of the TE slab modes of this new region since the TE slab modes are the same in each as shown previously. Since the axial profiles can then be made to be component-wise proportional, all boundary conditions can again be satisfied by guided-mode solutions alone and the structure is radiation-free.

An FDTD simulation and diagram of a two-dimensional structure that obeys (2) is presented in FIG. 2. A nonlinear color-scale is applied to highlight the presence of any radiation. In contrast to the field of FIG. 1, no radiation is observable. For the device of FIG. 1, T=5.55a, a=0.284λ, $\epsilon_1 = 9\epsilon_0$, $\epsilon_2 = 6\epsilon_0$, and $\tilde{\epsilon}_2 = \epsilon_0$. For the device of FIG. 2, T=5.55a, a=0.284λ, $\epsilon_1 = 9\epsilon_0$, $\epsilon_2 = 6\epsilon_0$, $\tilde{\epsilon}_1 = 4\epsilon_0$, and $\tilde{\epsilon}_2 = \epsilon_0$.

Figure 4:
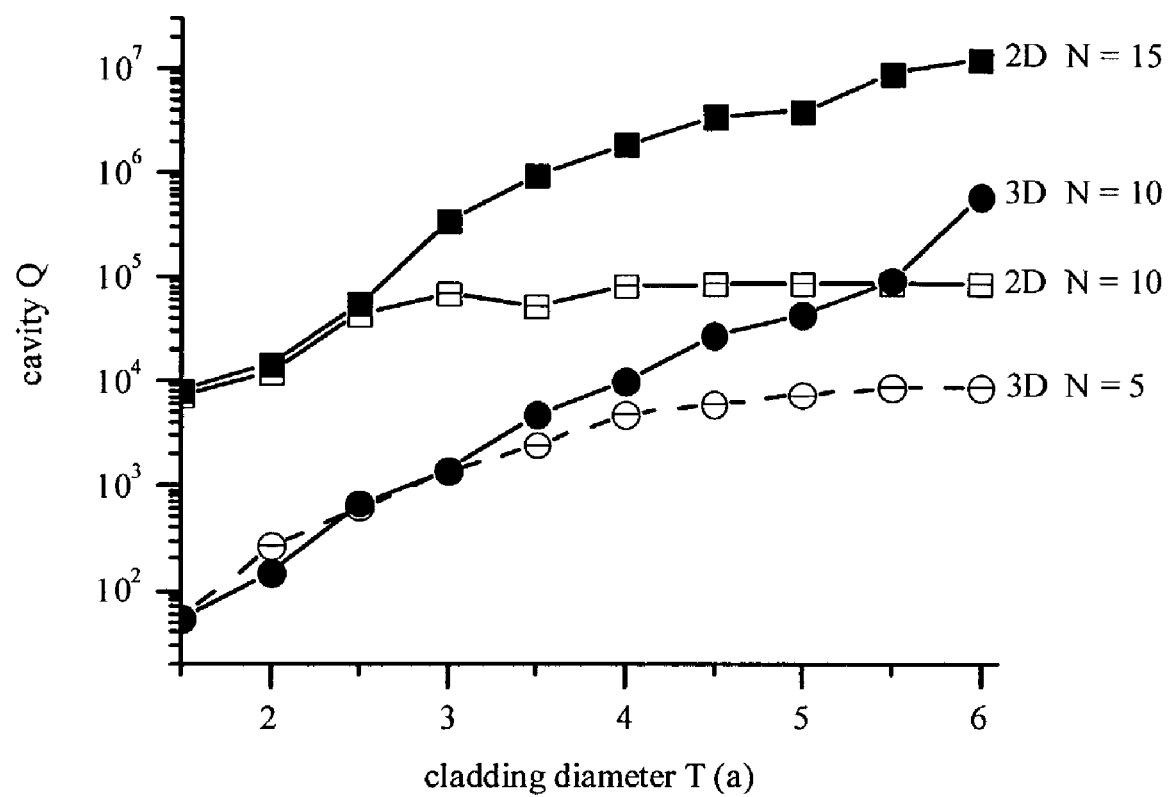
FIG. 4 is a graph depicting the Q of the two-dimensional and three-dimensional structures of FIGS. 2 and 3 as a function of cladding diameter.

A diagram of an ideal three-dimensional structure with an axially propagating field is presented in FIG. 3. FDTD simulations of two-dimensional (e.g. FIG. 2) and three-dimensional (e.g. FIG. 3) structures were performed to determine the cavity Q as a function of the cladding thickness for two different values of N (the number of bilayer pairs on a side). The results are presented in FIG. 4, where calculations were obtained through FDTD simulations. Here again, $\epsilon_1 = 9\epsilon_0$, $\epsilon_2 = 6\epsilon_0$, $\tilde{\epsilon}_1 = 4\epsilon_0$, and $\tilde{\epsilon}_2 = \epsilon_0$. The cavity Qs increase with the cladding thickness until they are ultimately limited by the finite number of layer pairs.

Figure 5:
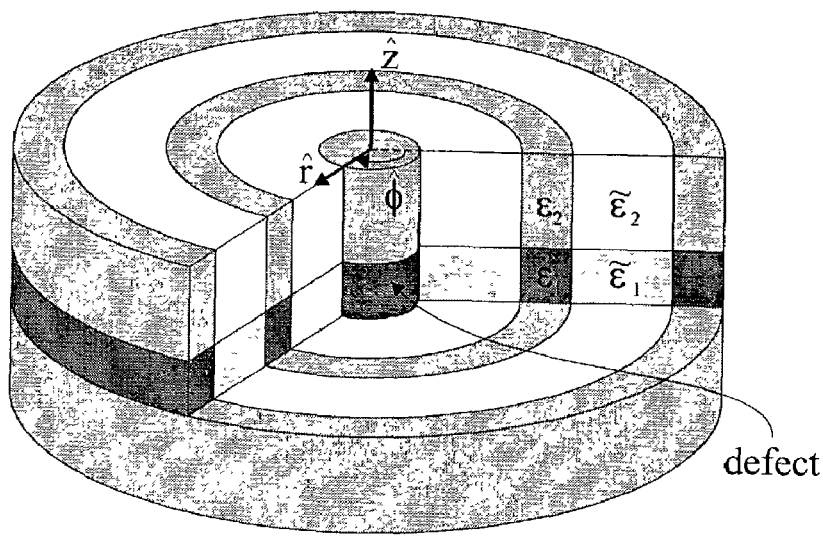
FIG. 5 is a diagram of a three-dimensional radiation-free cylindrical cavity with annular Bragg layers.

FIG. 5 is a diagram of an ideal three-dimensional structure with a radially propagating field. Such a structure lends itself readily to planar fabrication techniques since it requires only three layers. Guidance is achieved along the $\hat{z}$-direction via total internal reflection and confinement is achieved along the $\hat{r}$-direction via annular Bragg layers.

Figure 6:
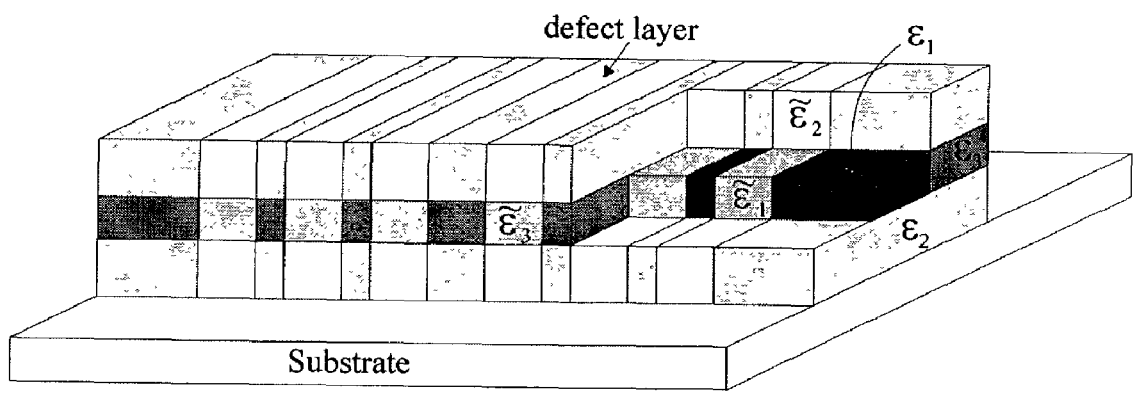
FIG. 6 is a diagram of a high-Q low-radiation cavity.

Near perfect high Q structures that more readily lend themselves to fabrication and integration are also highly desirable. One such structure is presented in FIG. 6. Here, the structure is the rectangular equivalent of the cylindrical structure presented in FIG. 3. The field is made to be nearly TE by confining the field only weakly in the lateral direction (i.e. $\epsilon_3 \approx \epsilon_1$, $\epsilon_3 \approx \tilde{\epsilon}_1$). The advantage of the present structure is that it may be readily fabricated with standard fabrication techniques and in contrast to the structure in FIG. 5, may be coupled to quite easily.

Figure 7:
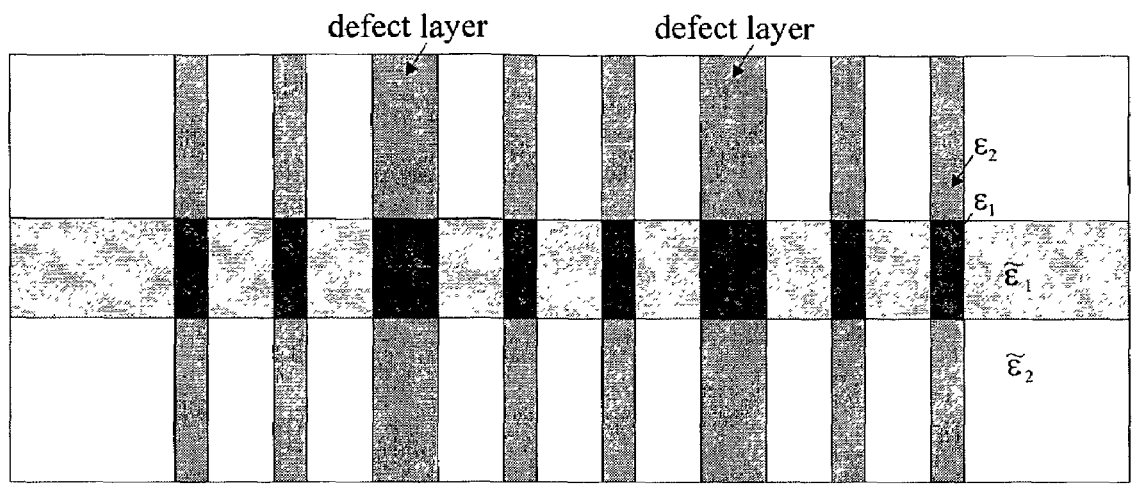
FIG. 7 is a two-dimensional view of a $2^{nd}$ order filter.
Figure 8:
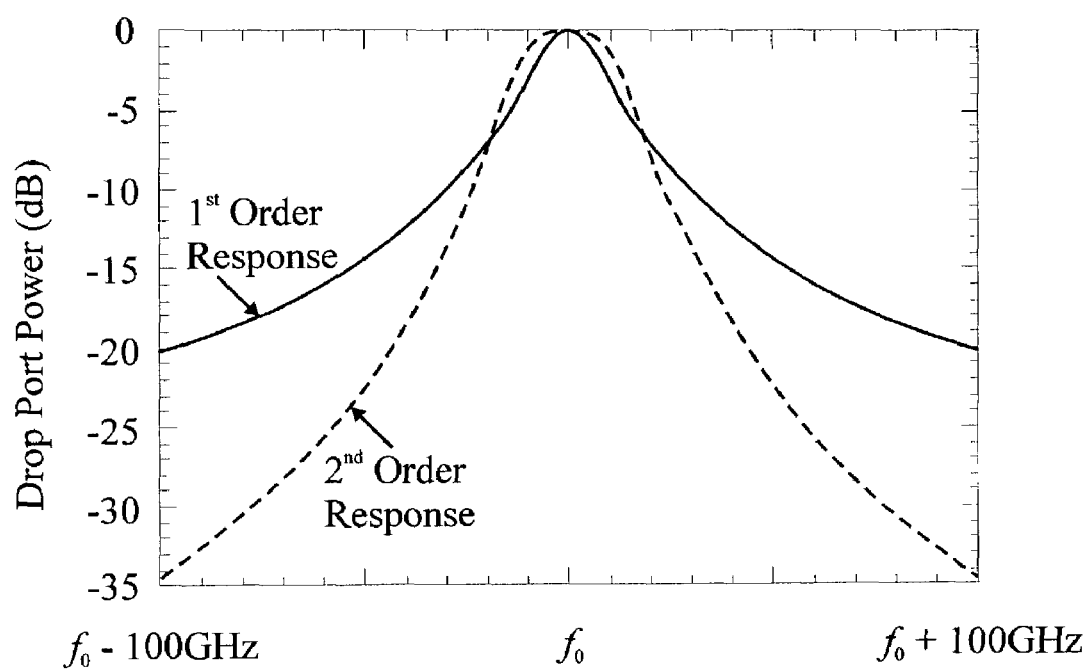
FIG. 8 is a graph showing $1^{st}$ and $2^{nd}$ order filter responses.

Higher order filters may be constructed with any of the aforementioned geometries by simply using a plurality of defect sites. FIG. 7 depicts a $2^{nd}$ order filter and FIG. 8 compares a $1^{st}$ and a maximally-flat $2^{nd}$ order filter response. The $2^{nd}$ order filter has a flatter pass-band and steeper roll-off and is therefore a more desirable filter for communications applications which carry many closely spaced signals with finite bandwidths. In general, the higher the filter order, the flatter the pass-band and the steeper the roll-off. High Q resonators are needed to construct high-order filters with sharp roll-off.

Figure 9:
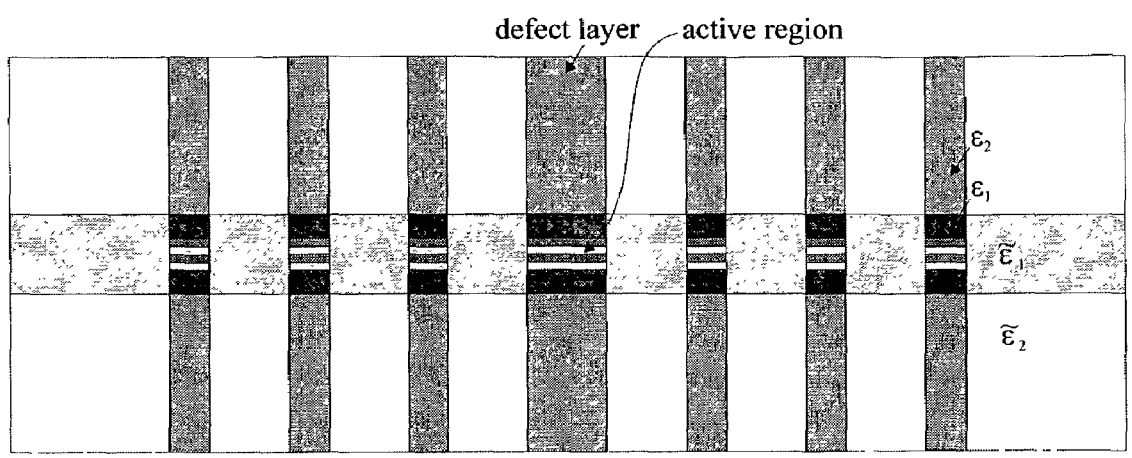
FIG. 9 is a two-dimensional view of a horizontally oriented radiation-free active filter or laser.
Figure 10:
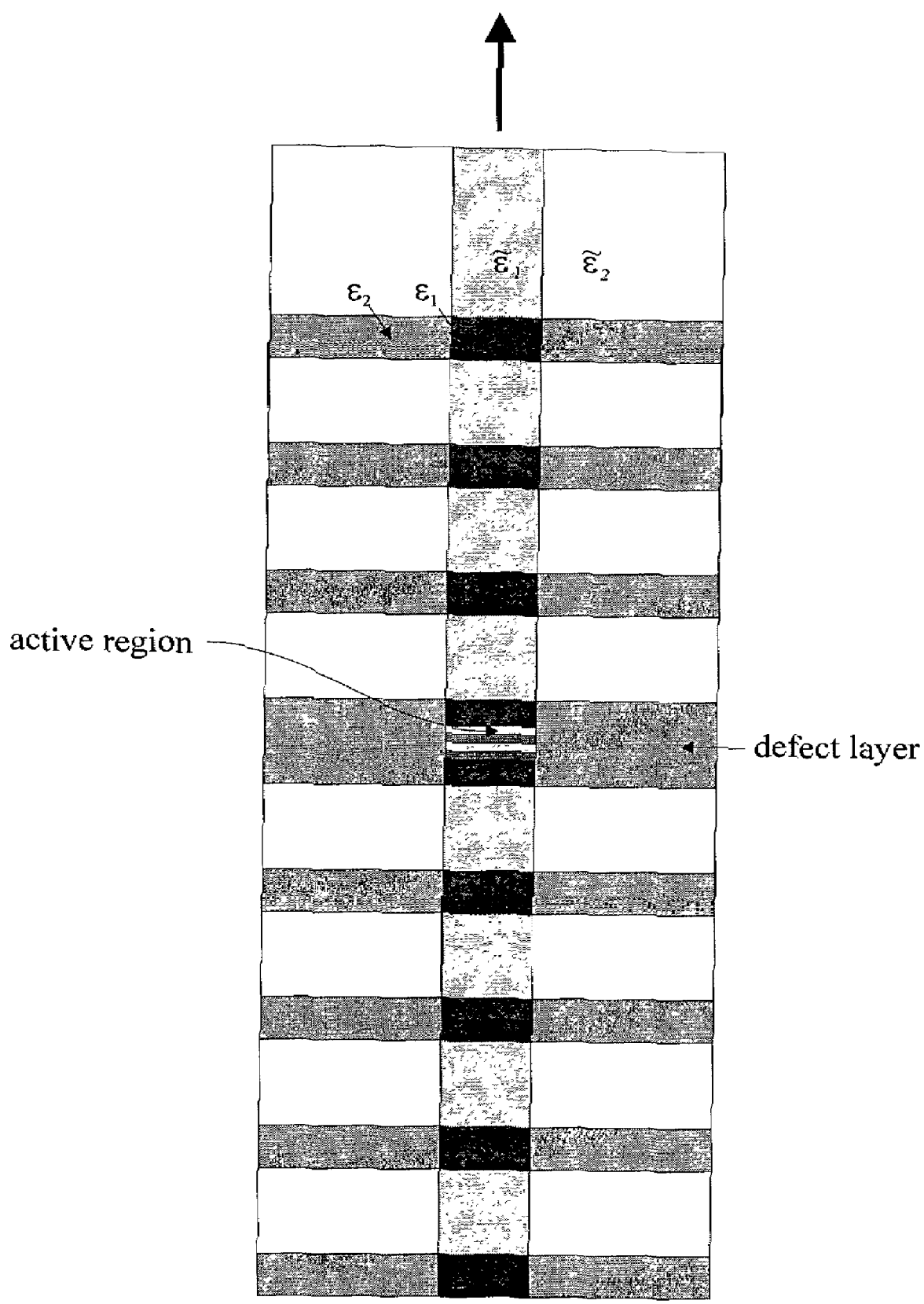
FIG. 10 is a two-dimensional view of a vertically oriented laser or VCSEL (Vertical Cavity Surface Emitting Laser) with no undesirable junction radiation.

Active devices may as well be constructed from any of the aforementioned cavity geometries. FIG. 9 depicts an active device formed from a cavity with propagation in the plane of the substrate (e.g. the cavities in FIGS. 5 and 6) and FIG. 10 depicts an active device formed from a cavity with propagation perpendicular to the plane of the substrate (e.g. the cavity in FIG. 3). In either case the active region may be used to form a laser, switch, modulator or detector. However, the vertically oriented cavity lends itself particularly well to the VCSEL (Vertical Cavity Surface Emitting Laser) application.

Methods for achieving radiation-free and very low radiation optical cavities have been described herein. Importantly, and in contrast to prior designs, low loss cavities are achieved by using four separate permittivities in the cores and claddings of the two waveguide sections that form the resonator building blocks. Principally, this invention allows for the development of very high Q structures and thus well defined filter passbands.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

What is claimed is:

1. A device comprising:
a plurality of waveguide sections, each of said waveguide sections adjacent another waveguide section and forming an optical resonant cavity therebetween, at least one waveguide section having a different cladding permittivity than an adjacent one of said plurality of waveguide sections, and wherein electric field distributions through said adjacent waveguide sections are mode-matched in a direction orthogonal to a desired direction of propagation in the device such that field distributions between waveguide sections are matched so as to reduce coupling to radiation modes within the device thereby improving a Q characteristic of the optical resonant cavity wherein the sections are mode-matched through adjustments of at least one of said waveguide sections core permittivity and said waveguide sections cladding permittivity.

2. The device of claim 1 wherein a first waveguide section has a core permittivity $\epsilon_1$ and a cladding permittivity $\epsilon_2$ and a second waveguide section has a core permittivity $\tilde{\epsilon}_1$ and a cladding permittivity $\tilde{\epsilon}_2$, and wherein said adjacent waveguide sections are mode-matched in accordance with the formula: $\epsilon_1 - \epsilon_2 = \tilde{\epsilon}_1 - \tilde{\epsilon}_2$.

3. The device of claim 1 wherein said device is operated with an electric field which is generally parallel to a core-to-cladding interface of said waveguide sections.

4. The device of claim 1 wherein at least one waveguide section comprises a defect layer.

5. The device of claim 4 wherein said device has at least one active region disposed in the defect layer of said device.

6. The device of claim 5 wherein said active region is a gain medium used to form a light source.

7. The device of claim 6 wherein said light source comprises a laser.

8. The device of claim 5 wherein said active region is used for tuning or turning off the resonance.

9. high order filter comprising a plurality of resonators coupled together wherein at least one of such resonators comprises a plurality of waveguide sections with at least one waveguide section having a different cladding permittivity than an adjacent one of said plurality of waveguide sections, and wherein said adjacent waveguide sections are mode-matched in a desired direction of propagation in the filter through adjustments of at least one of said waveguide sections core permittivity and said waveguide sections cladding permittivity such that field distributions between waveguide sections are matched thereby improving a Q characteristic of the filter and reduce coupling to radiation modes within the device which are orthogonal to the desired direction of propagation.

10. The filter of claim 9 wherein a first waveguide section has a core permittivity $\epsilon_1$ and a cladding permittivity $\epsilon_2$ and a second waveguide section has a core permittivity $\tilde{\epsilon}_1$ and a cladding permittivity $\tilde{\epsilon}_2$, and wherein said adjacent waveguide sections are mode-matched in accordance with the formula: $\epsilon_1 - \epsilon_2 = \tilde{\epsilon}_1 - \tilde{\epsilon}_2$.

11. The filter of claim 9 wherein said waveguide sections have a shape selected from the group including cylindrical and annular.

12. The filter of claim 9 wherein at least one of said waveguide sections comprise a defect layer.

13. The filter of claim 12 wherein said device has at least one active region disposed in said at least one defect layer of said device.

14. The filter of claim 13 wherein said at least one active region is used for at least one of tuning, detection, and turning off the filter.

15. A device comprising:
a plurality of waveguide sections, each of said waveguide sections having a cylindrical cross-sectional shape and arranged in an axial direction to form an optic junction there between, at least one waveguide section having a different cladding permittivity than an adjacent one of said plurality of waveguide sections, and wherein said adjacent waveguide sections are mode-matched through adjustments of at least one of said waveguide sections core permittivity and said waveguide sections cladding permittivity with each of said plurality of waveguide sections being oriented such that an electric field can propagate in an axial direction through each of said waveguide sections and electric field distributions through said adjacent waveguide sections are mode-matched in a direction orthogonal to the axial direction of propagation in the device so as to reduce coupling to radiation modes within the device thereby improving a Q characteristic of the device.

16. The device of claim 15 wherein a first waveguide section has a core permittivity $\epsilon_1$ and a cladding permittivity $\epsilon_2$ and a second waveguide section has a core permittivity $\tilde{\epsilon}_1$ and a cladding permittivity $\tilde{\epsilon}_2$, and wherein said adjacent waveguide sections are mode-matched in accordance with the formula: $\epsilon_1 - \epsilon_2 = \tilde{\epsilon}_1 - \tilde{\epsilon}_2$.

17. The device of claim 15 wherein at least one of said waveguide sections comprises a defect layer.

18. The device of claim 15 wherein said waveguide sections form a diffractive grating.

19. The device of claim 15 wherein said waveguide sections form a resonant cavity.

20. The device of claim 15 operated with an electric field which is generally parallel to a core-to-cladding interface of said waveguide sections.

21. The device of claim 17 wherein said device has at least one active region disposed in the defect layer of said device.

22. The device of claim 21 wherein said active region is a gain medium used to form a light source.

23. The device of claim 22 wherein said light source comprises a laser.

24. The device of claim 18 wherein said active region is used for at least one of tuning and turning off device resonance.

25. A device comprising:
a plurality of waveguide sections, each of said waveguide sections having a shape chosen from the group comprising cylindrical and annular, each of said waveguide section adjacent another waveguide section and forming a radially symmetric optic junction therebetween, at least one waveguide section having at least one of a different core permittivity and a different cladding permittivity than an adjacent one of said plurality of waveguide sections, and wherein said adjacent waveguide sections are mode-matched in a desired direction of propagation in the device through adjustments of at least one of said waveguide sections core permittivity and said waveguide sections cladding permittivity so as to reduce the generation of radiation modes at each optic junction within the device thereby improving a Q characteristic of the device.

26. The device of claim 25 wherein a first waveguide section has a core permittivity $\epsilon_1$ and a cladding permittivity $\epsilon_2$ and a second waveguide section has a core permittivity $\tilde{\epsilon}_1$ and a cladding permittivity $\tilde{\epsilon}_1$, and wherein said adjacent waveguide sections are mode-matched in accordance with the formula: $\epsilon_1 - \epsilon_2 = \tilde{\epsilon}_1 - \tilde{\epsilon}_2$.

27. The device of claim 25 wherein at least one waveguide section comprises a defect layer.

28. The device of claim 25 wherein said waveguide sections form a diffractive grating.

29. The device of claim 25 wherein said waveguide sections form a resonant cavity.

30. The device of claim 25 operated with an electric field which is generally parallel to a core-to-cladding interface of said waveguide sections.

31. The device of claim 27 wherein said device has at least one active region disposed in the defect layer of said device.

32. The device of claim 31 wherein said active region is a gain medium used to form a light source.

33. The device of claim 32 wherein said light source comprises a laser.

34. The device of claim 31 wherein said active region is used for at least one of tuning and turning off device resonance.

* * * * *

UNITED STATES PATENT AND TRADEMARK OFFICE
CERTIFICATE OF CORRECTION

PATENT NO. : 7,224,868 B2
APPLICATION NO. : 10/279777
DATED : May 29, 2007
INVENTOR(S) : Watts et al.

Page 1 of 1

It is certified that error appears in the above-identified patent and that said Letters Patent is hereby corrected as shown below:

Column 1, line 63 delete "foregoing it" and replace with --foregoing, it--.

Column 3, line 8 delete "FIG. 2 or 3" and replace with --FIGS. 2 or 3--.

Column 3, line 40 delete "solution we" and replace with --solution, we--.

Column 3, line 48 delete " $\mathbf{H}_T(1=r) = t \cdot \tilde{\mathbf{H}}_T$ " and replace with -- $\mathbf{H}_T(1+r) = t \cdot \tilde{\mathbf{H}}_T$ --.

Column 4, line 9 delete "dimensions one" and replace with --dimensions, one--.

Column 5, line 26 delete "case the" and replace with --case, the--.

Column 5, lines 39-40 delete "invention it" and replace with --invention, it--.

Column 6, line 17 delete "high" and replace with --A high--.

Column 6, line 53 delete "there between" and replace with --therebetween--.

Column 8, line 11 delete " $\tilde{\varepsilon}_1,$ " and replace with -- $\tilde{\varepsilon}_2,$ --.

Signed and Sealed this

Fifteenth Day of April, 2008

JON W. DUDAS
*Director of the United States Patent and Trademark Office*